United States Patent
Weststrate et al.

[15] 3,699,220
[45] Oct. 17, 1972

[54] DENTIFRICE
[72] Inventors: Jan Weststrate; Christiaan Albertus Johannes Grabe, both of Amersfoort, Netherlands
[73] Assignee: N.V. Cosmetische Fabriek "Prondenta", Amersfoort, Netherlands
[22] Filed: July 10, 1970
[21] Appl. No.: 53,990

[52] U.S. Cl.................................424/52, 424/57
[51] Int. Cl..........................................A61r 7/16
[58] Field of Search.......................424/48–58, 128

[56] References Cited

OTHER PUBLICATIONS

Koenig et al., Helv, Odont. Acta, Vol. 10, pages 19–28, 1966

Primary Examiner—Richard L. Huff
Attorney—Robert E. Burns and Emmanuel J. Lobato

[57] ABSTRACT

A dentifrice having anticariogenic activity is prepared by including therein a monofluophosphate and a trimetaphosphate.

3 Claims, No Drawings

DENTIFRICE

This invention relates to a method of preparing dentifrices. By dentifrices as used in this specification and the appended claims are understood solid, kneadable, paste-like, powdered and liquid compositions for the cleaning and general care of the teeth and mouth cavity. It is known that these dentifrices may contain substances to protect the teeth from carious affection. The object of the invention is to prepare new mouth-hygienic agents which serve this purpose. By mouth-hygienic agents are understood tooth powder, toothpaste, mouth-wash, chewing-gum and chewing tablets.

Although caries is the most widely spread common disease, the details of the carious process are not known. There are chemical agents which inhibit the caries progress, such as fluorine compounds and phosphates.

The anticariogenic effect of some fluorides has long been established by epidemiologic investigation. Of other fluorides, such as sodium monofluophosphate and zirconium tin fluoride, this property is known by recent experimental investigation. The cariostatic effect of the fluoride ion is utilized in mass medication by fluoridation of drinking water and also by fluoridation of house-hold salt.

The anticariogenic effect of several phosphates has appeared from food tests and from the so-called topical application. On topical application a liquid is pencilled onto carefully cleaned dental elements. The loss of phosphates in refining foodstuffs such as flour and sugar and the increasing consumption of these refined products are considered important causes of the increasing tooth decay.

It has only partly been explained in what manner fluorides and phosphates delay the progress of the carious process. It can be understood from the chemical properties of the fluorine compounds and of the phosphates that they can even lose their anticariogenic properties under certain conditions. Both substances are complex formers and they may lose their typical properties when forming a complex. By formation of calcium fluoride, fluorides may also affect the enamel instead of strengthening it, and certain phosphates may form soluble calcium phosphates with calcium from the teeth and weaken the surface of the tooth by demineralization.

In any case, it has been shown that both fluorides and phosphates may have an anticariogenic effect and it seems ideal, therefore, to include them in combination in dentifrices.

It is, therefore, an object of the invention to prepare dentifrices in which the anticariogenic properties of soluble fluorides are supported by the specific properties of inorganic phosphates.

The selection of a suitable phosphate is rather difficult. These difficulties are even greater if the fluoride used is sodium monofluophosphate (MFP), which is one of the most recent cariostatic fluorides. Sodium monofluophosphate was first applied in toothpaste by Ericsson (see Dutch application 254,647). He used calcium carbonate as an abrasive, because he believed that the insoluble phosphates could not be combined with MFP. Though this has been superceded now, it is clear that insoluble orthophosphates can entirely or partly undo the effect of MFP, as also appeared from applicants' work As enamel consists of a basic calcium orthophosphate, it could be assumed that orthophosphates show a cariostatic effect. The results of feed tests, carried out by various research workers with various kinds of animals, in which orthophosphates were added to the feed, support this supposition, even though the caries reductions were sometimes very slight; they sometimes varied from 0 to 100 percent. Topical application of soluble orthophosphates to rats did not produce reduction of the caries increase, however. The caries-reducing properties of a fluoride containing paste appeared to become considerably poorer by the addition of soluble orthophosphates.

Soluble pyrophosphate is a constituent of saliva, which is assumed to protect the enamel from dissolving. It is obvious to test this substance for its anticariogenic effect and this substance has been used for feed tests. The caries reductions obtained varied from 0 to 80 percent. However, it is difficult to include this substance in toothpaste with calcium containing abrasives. If abrasives are used which do not contain calcium, such as insoluble sodium metaphosphate (ISMP) and silicon dioxide, fewer difficulties arise. Surprisingly, however, the soluble pyrophosphates appeared to considerably reduce the caries-reducing properties of the paste rather than improving them.

Trimetaphosphates are substances which are foreign to the human body. Yet is was exactly these substances which showed the highest caries reductions in feed tests, namely 95 percent. On topical application, on the other hand, it appeared that trimetaphosphates hardly reduced the caries frequency. In view of the experience with the other soluble phosphates and the fact that trimetaphosphates are foreign to the body, no more could they be expected to have a caries-reducing effect when included in toothpaste. This expectation was fulfilled as far as the normal toothpaste is concerned: the normal composition supplemented with trimetaphosphate even showed a slight worsening of the caries-reducing properties of the finished product. It was surprisingly found that in combination with sodium monofluophosphate the caries reduction increased so strongly that one can speak of synergism. This unexpected synergistic effect of fluoride and trimetaphosphate cannot be explained at the moment.

Comparative tests were conducted, of which the results are given in the following table.

TABLE

| Composition tooth paste (in % by weight) | A | B | C | D | E | F | G |
|---|---|---|---|---|---|---|---|
| abrasive | 35.0 | 35.0 | 35.0 | 35.0 | 35.0 | 35.0 | 35.0 |
| water | 30.4 | 30.4 | 30.4 | 30.4 | 30.4 | 30.4 | 30.4 |
| miscellaneous | 34.6 | 33.6 | 31.6 | 31.6 | 32.6 | 32.6 | 31.6 |
| sodium orthophosphate | — | — | 2.0 | — | — | — | — |
| sodium pyrophosphate | — | — | — | 3.0 | — | — | — |
| sodium trimetaphosphate | — | — | — | — | — | 2.0 | 2.0 |
| sodium monofluophosphate | — | 1.0 | 1.0 | — | — | — | 1.0 |
| organic phosphate | — | — | — | — | 2.0 | — | — |
| Caries frequency in % of the placebo A | 100 | 48 | 83 | 132 | 102 | 106 | 39 |

The results shown in the above table have been obtained in experiments with male Wistar rats, which freely consumed sugar-rich food.

The invention accordingly relates to a method of preparing a fluoride containing dentifrice having anticariogenic activity, which method is characterized in that a monofluophosphate and a trimetaphosphate are included in the dentifrice.

As monofluophosphate is preferably used the sodium salt and as trimetaphosphate, sodium trimetaphosphate is in the first place eligible. Besides, other trimetaphosphates, such as the zirconium and tin salt, are suitable.

The trimetaphosphate content in the dentifrice may be between about 0.01 and 20 percent by weight. Such a content also applies to the fluorine compound. In a toothpaste is preferably used 0.2–15 percent by weight of sodium trimetaphosphate side by side with 0.6–5 percent by weight of sodium monofluophosphate.

The effect of the sodium monofluophosphate increases with decreasing pH, but then the chance of the teeth by being affected the acid medium becomes greater. Therefore, 3.5–9.5 is preferably chosen as a safe and active pH range. For special dentifrices, specific requirements may come into existence, as a result of which the pH-range may become narrower. For toothpaste, a pH of 6.0–7.5 is preferable.

Examples of dentifrices
I  Toothpaste

| | % by weight |
|---|---|
| Dicalciumphosphate dihydrate | 35.– |
| Glycerol | 30.– |
| Carboxymethyl cellulose | 1.5 |
| Bentonite | 1.– |
| Sodium lauryl sulphate | 1.5 |
| Sodium monofluophosphate | 0.9 |
| Sodium trimetaphosphate | 2.5 |
| Saccharin | 0.1 |
| Water-mint oil | 1.– |
| Metaphosphoric acid | q.s. |
| Water | to 100 |

II. Medicinal toothpaste

| | |
|---|---|
| Calcium pyrophosphate | 20.– |
| Aluminum oxide | 20.– |
| Glycerol/sorbitol 1:1 | 32.– |
| Carboxymethyl cellulose | 1.– |
| Sodium monofluophosphate | 5.– |
| Zirconium trimetaphosphate | 15.– |
| Saccharin | q.s. |
| Flavoring substance | q.s. |
| Water | to 100 |

III. Mouth-wash

| | |
|---|---|
| Ethanol | 5.– |
| Glycerol | 5.– |
| Flavoring substance composition | 0.5 |
| Sodium monofluophosphate | 0.25 |
| Sodium trimetaphosphate | 0.75 |
| M-benzene disulfonamide | 0.05 |
| Azulene | 0.05 |
| Water | to 100 |

IV. Chewing gum composition

| | |
|---|---|
| Gum basis | 35.– |
| Wintergreen oil | 0.2 |
| Sorbitol | 64.1 |
| Sodium trimetaphosphate | 0.5 |
| Sodium monofluophosphate | 0.2 |

From this composition, pieces can be made of 1.3 g. Each day a packet of 5 pieces may be consumed.

V. Tooth-powder

| | |
|---|---|
| Calcium carbonate | 10.– |
| Dicalcium phosphate dihydrate | 82.85 |
| Sodium monofluophosphate | 2.– |
| Sodium trimetaphosphate | 4.– |
| sodium lauryl sulphate | 0.5 |
| Peppermint oil | 0.6 |
| Saccharin | 0.05 |

VI. Composition for chewing tablets

| | |
|---|---|
| Dicalcium phosphate | 4.– |
| Sodium trimetaphosphate | 0.25 |
| Sodium monofluophosphate | 0.1 |
| Sodium aluminum silicate | 0.65 |
| Raspberry essence | q.s. |
| Mannitol | to 100 |

With this composition tablets can be made of 0.5 g by pressing. From 6 to 12 tablets may be used each day.

We claim:

1. A toothpaste dentifrice having synergistic anticariogenic activity containing about 0.9 percent by weight of sodium monofluorophosphate and about 2.5 percent by weight of sodium trimetaphosphate.

2. A toothpaste according to claim 1, wherein the pH of the toothpaste ranges from 6.0 – 7.5.

3. A method of reducing dental caries which comprises brushing the teeth with a dentifrice composition of claim 1.

* * * * *